United States Patent [19]

Perrine et al.

[11] 4,232,597
[45] Nov. 11, 1980

[54] APPARATUS FOR SMOKING FOODS AND SMOKE PRODUCING MATERIAL THEREFOR

[76] Inventors: Paul M. Perrine, P.O. Box 270, Aurora, Ind. 47001; James A. Cassera, P.O. Box 290, Prescott, Ariz. 86302

[21] Appl. No.: 904,881

[22] Filed: May 11, 1978

[51] Int. Cl.³ .............................................. A23B 4/04
[52] U.S. Cl. ........................................ 99/468; 99/482
[58] Field of Search ................ 99/482, 467, 468, 481; 44/14

[56] References Cited

U.S. PATENT DOCUMENTS

| | | | |
|---|---|---|---|
| 1,166,146 | 12/1915 | Neff | 99/481 |
| 2,789,877 | 4/1957 | Pfundt | 99/481 |
| 2,842,043 | 7/1958 | Reuland | 99/481 |
| 3,091,012 | 5/1963 | Bell | 44/14 |
| 3,776,127 | 12/1973 | Muse | 99/481 |
| 3,817,166 | 6/1974 | McLain | 99/480 |
| 4,020,322 | 4/1977 | Muse | 99/448 |
| 4,130,052 | 12/1978 | Jacobson | 99/482 |

FOREIGN PATENT DOCUMENTS

692003  6/1940  Fed. Rep. of Germany ............ 99/482

*Primary Examiner*—Robert W. Jenkins

[57] ABSTRACT

An energy and fuel efficient portable smoker for quickly imparting a smoked flavor to comistibles. The apparatus includes an airtight enclosure which prevents escape of smoke pyrolyzed from a small quantity of smolderable material contained in a low power electrically heated smoker unit housing removably attached to the smoker enclosure. A thermostat controls heating time to rapidly smoke comistibles with minimal temperature rise within the enclosure. The removable smoker unit may be used separately from the enclosure to smoke comistibles in any type of conventional cooking or dehydrating appliance or enclosure.

12 Claims, 5 Drawing Figures

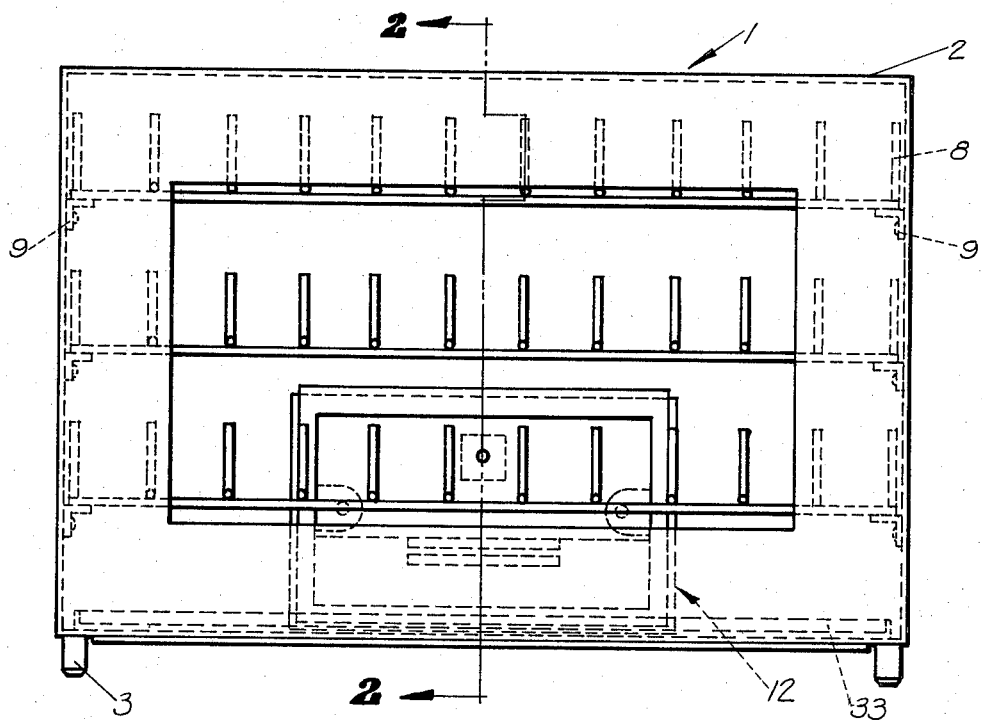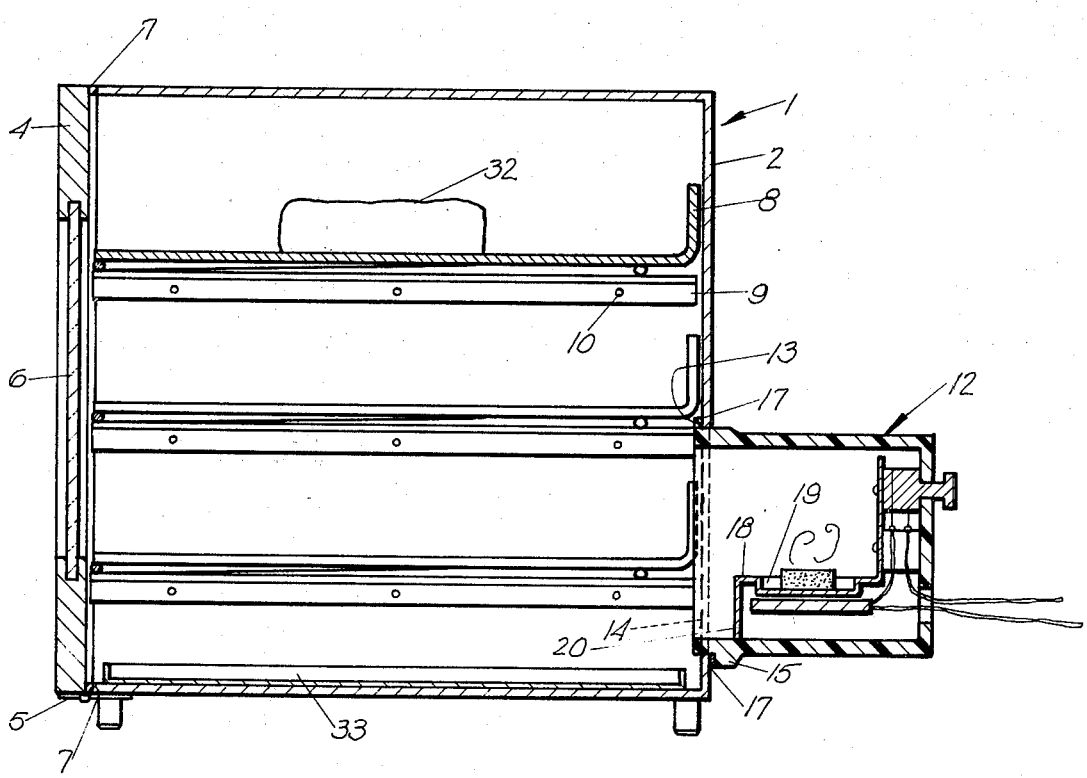

APPARATUS FOR SMOKING FOODS AND SMOKE PRODUCING MATERIAL THEREFOR

BACKGROUND OF THE INVENTION

1. Field of the Invention

The present invention relates generally to apparatus for treating foodstuffs, and more particularly to an energy and fuel efficient smoker for rapidly imparting a smoked flavor to comistibles and the like.

2. Description of the Prior Art

Although various types of devices are known for imparting a smoked flavor or aroma to foodstuffs, such devices usually operate at an elevated temperature to cook the comistibles in the presence of a smoke particle laden atmosphere to give the food a particular desired taste. While this procedure is satisfactory in commercial applications where a relatively large quantity of food is cooked and smoked, such prior art smokers have not interested the general consuming public as a result of the devices high initial and operating costs, as well as the long cooking times required.

For example, the standard type of prior art smoking unit comprises a vented enclosure having heating means which serve not only to raise the internal temperature of the enclosure for cooking the foodstuff, but also to pyrolyze a quantity of smolderable material such as wood dust or chips. In addition, a pan of water or other liquid may be included to produce the proper humidity conditions within the enclosure. Since the enclosure is not airtight, only a very small percentage of the smoke particles actually make contact with the foods on their way to being exhausted to the atmosphere. In addition, since the smoker is constantly giving off large quantities of smoke, it cannot be used in a closed environment such as a home kitchen. This drawback limits its usefulness to out-of-doors cooking which, of course, is restricted by the weather, local pollution laws, etc. In addition, the smoke must be replenished by continually adding smolderable material to the smoker which interferes with the treated atmosphere within the enclosure, as well as results in unnecessary waste of wood chips or dust. In some situations, too much smoke may be produced, causing the food to take on a pungent odor or taste.

Usually the heating element remains on during the entire cooking cycle to provide the temperature necessary within the enclosure to completely cook the food in the presence of the smoke atmosphere. This requires an unnecessarily large amount of heat energy, much of which is vented to the atmosphere and wasted. Certain types of food may spoil when they are permitted to remain for long periods of time at an elevated temperature, particularly where the humidity level has been increased by unnatural means. The relatively large temperature rise also prevents smoking of foods which do not require cooking, such as cheeses and nuts, or of foods which may be already cooked such as lunch meats, cold hors d'oeuvres, etc. Elevated temperatures also tend to dehydrate the food, resulting in loss of nutrients and flavor, as well as extending the time required for the foodstuff to pick up the smoke flavor. Attempts have been made to overcome this drawback by unnaturally raising the relative humidity level within the enclosure by a pan of water positioned near the heating element, but have met with limited success since the water serves only to replace the natural juices lost from the foodstuff being smoked and cooked. The high cooking temperatures necessary inside the smoker enclosure also cause the drippings or other fluids lost from the foodstuffs being treated to adhere tightly to the wire supports and inside surfaces of the smoker, greatly increasing the time and effort necessary to clean the smoker when cooking is finished.

In all known food smokers, the heating element which pyrolyzes the wood chips or dust is made an integral part of the smoking enclosure, and cannot be removed therefrom for use in conventional cooking appliances, such as toaster ovens, microwave ovens, and the like. This feature has also prevented widespread usage of known smoking devices which are often bulky, thereby prohibiting easy storage of the unit and discouraging frequent use.

SUMMARY OF THE INVENTION

The present invention provides an energy efficient portable smoker apparatus for quickly imparting a smoked flavor to comistibles in a closed environment, thereby eliminating the high temperatures, large expenditures of heat energy, large quantities of smolderable materials, and unnatural humidification procedures necessary with prior art smoking and cooking devices. In addition, the unit includes a removable smoker unit which may be used separately from the smoker enclosure to smoke comistibles in any type of conventional cooking or dehydration appliance.

The smoking apparatus of the present invention comprises an airtight enclosure in the form of a box-like cabinet which prevents escape of smoke pyrolyzed from a small quantity of smolderable material contained in a low power electrically heated smoker unit housing removably attached to the smoker enclosure. Since the smoke produced is entirely contained within the smoker enclosure, a very small quantity of smolderable material, such as special mixtures of fruit and nut wood chips or dust is necessary to impart a smoked flavor or aroma to a given quantity of foodstuff. Since the smoker is not vented to the atmosphere, its operation is very clean, permitting its use in closed rooms such as a kitchen. In addition, since the food is cold, all smoke produced is attracted to the surface of the food and absorbed. Accordingly, no smoke escapes into the working environment when the unit is opened to remove the treated food. This feature overcomes many of the disadvantages of prior art smokers which require very large quantities of smolderable materials producing a substantial amount of smoke which must be vented to the atmosphere. The closed environment of the smoking apparatus of the present invention also retains the natural humidity in the foodstuff being treated, thereby eliminating the need for unnatural replacement of the food fluids lost during cooking by a water pan or the like. Since, as previously indicated, all smoke is utilized, the apparatus does not rely on accidental contact with smoke particles as in prior art smokers.

The enclosure also contains a plurality of spaced wire-like racks or the like for supporting the food to permit the smoke to contact all surfaces of the foodstuff, thereby decreasing the treatment time necessary. If desired the ends of the wire members forming the racks may be upturned to prevent the food from contacting the interior surfaces of the enclosure, which could act to cut down the smoke contact with the food as well as unnecessarily soil the interior surface of the enclosure.

The front of the smoker enclosure may be provided with a hinged door to permit access to the interior of the smoker for placing foodstuffs therein or removing foodstuffs therefrom. The door may also be provided with a transparent window so that the progress of the smoking treatment may be followed. In general, the actual smoking operation will only take 5–15 minutes, as opposed to several hours with conventional smoking and cooking devices. Since all the smoke is utilized in the smoking operation, the operator can verify, by viewing the interior of the enclosure through the transparent window, that the food has absorbed the smoke and it may be removed.

The smoker unit comprises a box-like enclosure having one side open which communicates with the interior of the smoker cabinet enclosure by means of an opening in the wall of the smoker enclosure. The upper peripheral edge of the smoker unit opening forms a flange which engages and abuts the inner surface of the cabinet enclosure adjacent the opening. The remaining peripheral edges of the smoker unit enclosure opening form flanges which abut the outer surface of the cabinet enclosure adjacent the opening, thus permitting the smoker unit to be easily attached to and removed from the cabinet enclosure for cleaning or for use in or on other types of conventional cooking or dehydrating appliances.

The smoker unit contains a tray-like wood pan containing a central depression dimensioned to accept a small amount of specially formulated wood chips or dust capable of being pyrolyzed to produce the necessary amount of smoke. Since all of the smolderable material is converted to smoke, and none of the smoke is wasted by being vented to the atmosphere, only very small quantities of smolderable material are necessary, also conserving the amount of heat required to pyrolyze the material. Furthermore, since the amount of heat actually generated within the enclosure is kept to a minimum, and is actually kept away from the foodstuffs, the temperature rise within the enclosure is correspondingly very small. This permits comistibles which may be adversely effected by higher temperatures, such as cheese, nuts, dips, sauces, and appetizers to be effectively seasoned with the appropriately "flavored" smoke. In addition, if the temperature of the foodstuff is somewhat cool to begin with, such as meat or cheese removed directly from the refrigerator to the smoker, the resulting temperature rise will be even smaller. The nominal heat rise within the enclosure prevents dehydration of the food and eliminates the need for additional humidification to replace lost juices. In addition, low temperature operation of the smoker together with the short smoking times involved tend to discourage spoilage of the food. The low temperature operation also prevents encrustation of food or dried food juices which may become hardened on the racks or interior surfaces of the smoker enclosure as a result of the elevated temperatures of prior art smoking units. Finally, lower smoker temperatures tend to encourage moisture condensation on the foodstuff which carries along smoke particles. This phenomenon together with smoke particles which settle on the food by gravity, or are attracted thereto by electrostatic attraction, tend to decrease the smoking time necessary. In prior art smoking devices, however, very few smoke particles actually contacted the surface of the food on their way to being exhausted to the atmosphere.

The smoker unit may be attached to the wall of the enclosure, preferably below the horizontal centerline thereof, such as to the lower portion of a side or rear wall to permit natural convection currents created by the rising warm smoke to carry the smoke particles throughout the interior of the smoker enclosure. The smoker unit or generator is also removed from the food so as not to become contaminated by accidental spills or drips. Finally, since the smoker unit is mounted exteriorly to the smoker enclosure, it may easily be removed for transport or storage of the smoker, and is also located well away from the food containing part of the smoker, thereby increasing the amount of food which may can be treated at one time as well as removing the smoker unit from the area of inadvertent spills or drips which might otherwise adversely effect its operation. Further, the smoker may readily be cleaned without subjecting the electrical components to moisture.

The smoker unit also contains a low power heating element positioned beneath the tray-like wood pan for raising the temperature of the smolderable material to a temperature sufficient to produce the desired volume of smoke. The heating element may be controlled by means of a timer so that the heating element is energized for only the amount of time necessary to completely pyrolyze the smolderable material, which results in a significant energy savings and minimizes the heat rise in the smoker enclosure as described hereinabove. In a preferred embodiment, the heating element is electrically energized and includes a thermostatically controlled timer which disables the heating element after the minimum time required to pyrolyze the smolderable material. After the smoking cycle is completed, the thermostatically controlled timer may be manually reset to produce another timing sequence. Alternatively, the heat element may comprise a gas fired burner, canned heat, etc. In any of these embodiments, the smolderable material is consumed at the proper rate to completely fill the smoker with the desired quantity of smoke, after which no further smoke or heat is produced.

Various types of smolderable materials, such as wood chips or dust, may be utilized as will be explained in more detail hereinafter. In addition, the smolderable material may be formed in the shape of a pill-like wafer comprising compacted wood dust or wood dust held together with a binder, which is in turn raised to the proper temperature by the heating element. Alternatively, the pill-like pellet may be ignited within the tray-like wood pan like punk or incense (e.g. manually with a match) to produce the desired quantity of smoke. This method eliminates the need to measure the exact quantity of smolderable material required to make replacement of the smolderable material more certain. Also eliminated is the need for a burning means, in combination with the smoker unit, as the pellet would be ignited manually by a flame.

The smoke unit may also be removed from the smoker enclosure and utilized with existing cooking appliances, such as roaster ovens, toaster ovens, microwave ovens, conventional ovens, food dehydrators, etc. In some situations, the smoker unit is placed within the cooking appliance and the heating element activated to generate the desired quantity of smoke from a measured amount of smolderable material. In other situations, the smoker unit may be attached to the cooking appliance to function in a manner similar to that described hereinabove. In the case of some cooking appliances, such as a microwave oven, it may be necessary to provide special shielding gaskets between the smoker unit and the mounting wall of the oven to prevent leakage of microwave radiation, etc.

When the smoking operation is completed by any of the various methods described hereinabove or to be described hereinafter, the food may be cooked, if required, by any conventional means such as frying, roasting, grilling, broiling, etc. without affecting the smoke flavor or taste imparted to the food by the smoker of the present invention. If the particular food treated does not require cooking, it may be immediately consumed, or otherwise treated by marinating or the like, or stored until ready for use, without affecting the smoked flavor or taste.

BRIEF DESCRIPTION OF THE DRAWINGS

FIG. 1 is a front elevation view of the smoker of the present invention.

FIG. 2 is a cross-sectional view taken along section line 2—2 of FIG. 1.

DESCRIPTION OF THE PREFERRED EMBODIMENTS

Figure 3:
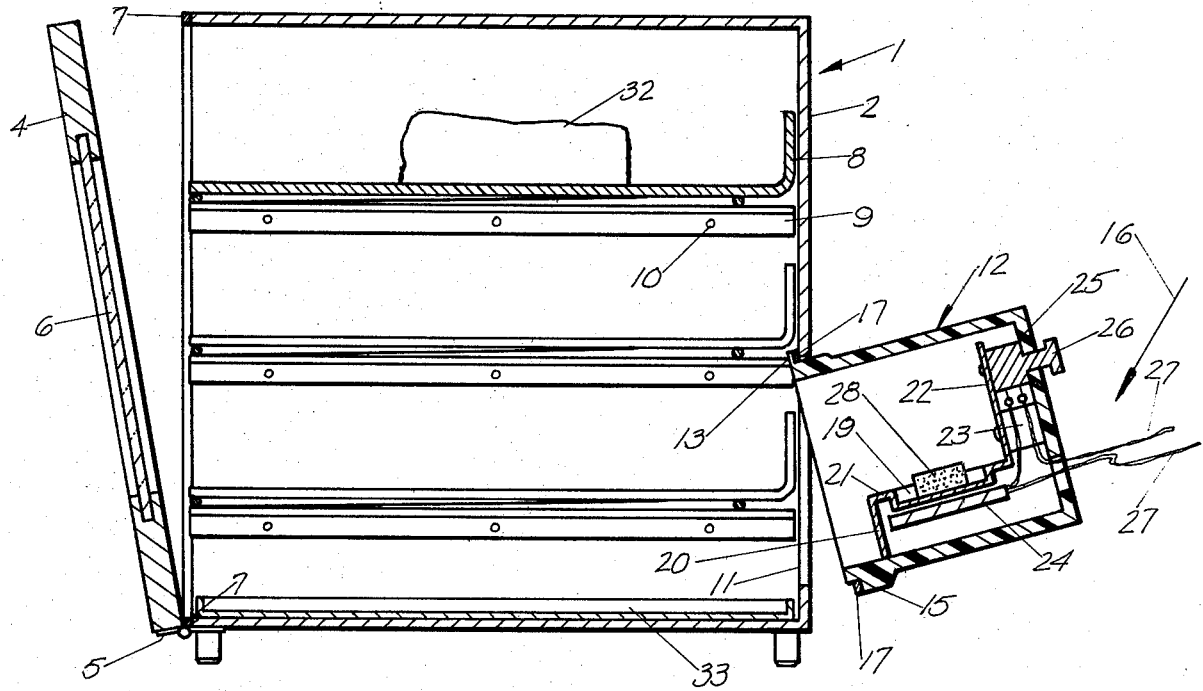
FIG. 3 is a cross-sectional view, similar to FIG. 2, showing the smoker unit being inserted into the rear wall of the smoker.
Figure 4:
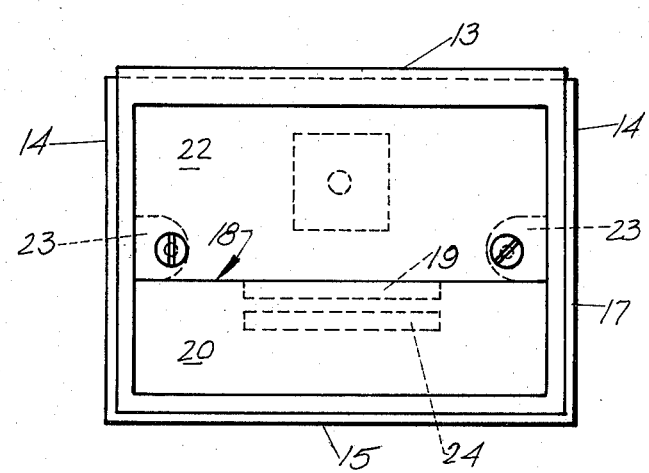
FIG. 4 is a front elevation view of the smoker unit.

The smoker apparatus of the present invention is illustrated generally at 1 in FIG. 1 and comprises an airtight box-like cabinet enclosure 2 having a top, a bottom, a back, and a pair of spaced side walls. Enclosure 2 may be fabricated of any suitable type of material including plastic, and may be constructed in a single piece or in several individual pieces joined by gluing, welding, brazing or the like. It will generally be preferred that enclosure 2 be constructed of a material which will not react with the acids and other chemical components contained in the smoke to cause undesirable aromas or tastes. However, in some instances it will be desirable to construct enclosure 2 of the smoke absorbing material, such as certain types of wood, which will retain the smoke aroma, thereby eliminating the need or desire to clean the interior of the smoker 1 after each use.

Enclosure 2 may be supported by legs, one of which is shown at 3, positioned at the corner of the bottom of smoker 1. Legs 3 may be dowel-like legs as illustrated, or may take the form of runners, or may be an integral part of the hinge for the door 4, etc., as desired.

The front of the smoker enclosure is provided with a door hingedly attached to the front of enclosure 2. Although for purposes of an exemplary showing, door 4 has been illustrated as attached at its lowermost edge to the bottom of enclosure 2 by a piano hinge 5, such that door 4 pivots downwardly and outwardly, it will be understood that door 4 may be hingedly or removably attached to enclosure 2 by any conventional means. Pulls (not shown) may also be provided in association with door 4 as required to permit easy opening of the door to gain access to the interior of smoker 1. In addition, latches (not shown) may also be provided to hold the door in place during the smoking process, as will be described hereinafter.

Door 4 may also be provided with a transparent window 6 constructed of any suitable material such as glass, plastic or the like, so that the progress of the smoking treatment may be observed. Since all of the smoke is utilized in the smoking operation of the present invention, the operator can easily verify, by viewing the interior of the enclosure through the transparent window 6, that the food has absorbed the smoke and that the door 4 may be opened.

The inner enclosure abutting surface of door 4, or the outer door engaging surface of the front peripheral edge of enclosure 2 may be provided with a suitable gasket 7 to prevent leakage of the smoke from around the door seal. In the case where the smoker unit is utilized in conjunction with a microwave oven (as will be described in more detail hereinafter), gasket 7 would be formed of a microwave radiation absorbing material to prevent leakage of microwave radiation as well as smoke from within the microwave oven.

Enclosure 2 is also provided with a plurality of spaced wire-like racks, one of which is shown at 8, for supporting the food to permit the smoke to contact all surfaces of the foodstuff, thereby decreasing the treatment time necessary. Although for purposes of an exemplary showing, racks 8 have been illustrated as comprised of wire-like members, it will be understood that any type of rack, such as expanded metal or the like, may be utilized which permits free circulation of smoke around the foodstuff.

Racks 8 may be supported at their ends by a pair of angle-shaped brackets 9 attached to the inner surfaces of the side walls of enclosure 2 by means of rivets 10 or the like, such that the lowermost surface of the ends of racks 8 rest on the outwardly extending planar legs of brackets 9 to permit easy removal and insertion of racks 8 into enclosure 2 for cleaning, etc. If the enclosure 2 is wood or plastic the racks 8 may be supported in spaced, aligned, grooves in the interior surface of the enclosure.

The side or rear ends of racks 8 may be upturned to form a series of upwardly extending projections to prevent the food from contacting the interior surfaces of enclosure 2, which could act to cut down the smoke contact with the food as well as unnecessarily soil the interior surfaces of enclosure 2.

A removable drip pan 33 is preferably provided for the bottom of the enclosure 2 to receive any drips from the foodstuff being smoked on the racks 8 in the smoker apparatus 1.

The lower portion of the rear wall of enclosure 2 contains an opening, such as the substantially rectangular-shaped opening 11, dimensioned to accept the forwardmost peripheral edge of the box-like enclosure forming the smoker unit or generator, shown generally at 12. The position of opening 11 permits smoker unit 12 to be attached to the lower portion of the rear wall to permit natural convection currents created by the rising warm smoke emitted by smoker unit 12 to carry the smoke particles throughout the interior of smoker enclosure 2. This eliminates the necessity for devices such as fans or vent openings to artifically provide reliable distribution of the smoke particles. In addition, since smoker unit 12 is removed from the food containing area, it is protected from contamination by accidental spills or drips. Finally, since smoker unit 12 is mounted exteriorly to smoker enclosure 2, it may easily be removed for transport or storage of smoker 1 and allows the use of combustibles or heat sensitive materials in the construction of the enclosure 2.

As noted, smoker or generator unit 12 comprises a substantially box-like enclosure having rear, top, bottom and side walls, and an open front which communicates with the interior of enclosure 2 when smoker unit 12 is attached to smoker 1. The upper forwardmost peripheral edge of smoker unit 12 is formed in an upstanding lip or flange 13, the rearwardmost surface of which is adapted to abut the innermost surface of enclosure 2 adjacent the upper edge of opening 11. The forwardmost edges of the side walls of smoker unit 12 terminate in outwardly extending lips or flanges 14, the forwardmost surfaces of which are coplanar with the rearwardmost surface of flange 13. When smoker unit 12 is attached to enclosure 2, as illustrated in FIG. 2, the forwardmost surfaces of flanges 14 abut the rearwardmost surface of the rear wall of enclosure 2. Finally, the forwardmost edge of the bottom of smoker unit 12 terminates in downwardly extending flange 15, the forwardmost surface of which is coextensive with the forwardmost surface of flanges 14. Thus when smoker unit 12 is attached to enclosure 2, as illustrated in FIG. 2, the forwardmost surface of flange 15 abuts the rearwardmost surface of the rear wall of enclosure 2.

Smoker unit 12 is inserted into opening 11 of enclosure 2 as illustrated in FIG. 3. Initially, upper flange 13 is inserted within opening 11 such that the rearwardmost surface of flange 13 abuts the forwardmost surface of the rear wall of enclosure 2, and the uppermost surface of the top of smoker unit 12 abuts the upper edge of opening 11. Smoker unit 12 is then pivoted inwardly and downwardly in the direction of arrow 16 until the leading edges of the smoker unit 12 passes into and through opening 11, such that the forwardmost surfaces of flanges 14 and 15 come to rest against the rearmost surfaces of the rear wall of enclosure 2. The weight of the smoker unit 12, since it is pivoting about the upper edge of the opening 11, causes the smoker unit 12 to substantially seal itself against the periphery of the opening 11 in the enclosure 2.

To remove smoker unit 12, the reverse procedure is applied to that described above, the unit being removed away from the opening 11 by pivoting the lower edge of the unit upwardly and outwardly in a direction opposite to that shown by arrow 16, until the unit is entirely free of enclosure 2. It will be understood that while for purposes of an exemplary showing, smoker or generator unit 12 has been described and illustrated as removably affixed to enclosure 2, it is considered within the scope of the present invention to provide a smoker 1 wherein the smoker unit 12 is non-removably attached to the enclosure 2.

A gasket 17 may be provided between smoker unit 12 and enclosure 2 to prevent undesirable escape of smoke therefrom. Where smoker unit 12 is used in connection with a microwave type oven (not shown), gasket 17 will be constructed of a material capable of absorbing microwave energy, to prevent the escape of harmful microwave radiation.

Smoker unit 12 also contains a tray-like smolderable material containing pan 18 containing a central depression 19 dimensioned to retain a small amount of specially formulated smolderable material capable of being pyrolyzed to produce the necessary amount of smoke. Pan 18, which may be constructed of any suitable noncombustible material such as metal, or the like, comprises a downwardly depending leg 20, the lower edge of which rests on the uppermost surface of the bottom of smoker unit 12. Leg 20 supports a substantially horizontal section 21 which contains central depression 19. The rearmost edge of horizontal portion 21 terminates in an upstanding flange 22 which is supported from the rear wall of smoker unit 12 by a pair of standoffs 23, or the like.

A heating element 24 is positioned beneath the tray-like pan 18 for raising the temperature of the smolderable material to a temperature sufficient to produce the desired volume of smoke. In the preferred embodiment illustrated herein, heating element 24 is electrically energized. However, it will be understood that the heating element may also comprise a gas fired burner, canned heat, etc.

It is also preferred that the heating element be controlled by means of any suitable timing device so that the heating element is energized only for that amount of time necessary to completely pyrolyze the smolderable material. As illustrated in FIG. 2 and FIG. 3, heating element 24 is electrically connected in series with a thermostatically controlled timer 25 which limits the time during which the heating element 24 is energized. Push button 26 provides a manual reset of thermostatic timer 25 to begin the timing sequence. In a typical situation, thermostatic timer 25 will permit current flow through heating element 24 by means of electrical conductor 27 from a conventional power outlet for a period necessary to pyrolyze the smolderable material which will generally be in the range of 30 to 120 seconds, whereupon thermostatic timer 25 will shut off, inhibiting further current flow through heating element 24, resulting in a significant energy savings.

It will also be understood that timer 25 may comprise an electrical thermostat associated with pan 18 which continues to permit current flow to heating element 24 until a particular temperature is sensed, whereupon the thermostat would shut off. Operation of this type of timer would be similar to that described hereinabove.

In lieu of a timing device 25, the heating element 24 may include sensing means which switches the heating element 24 off when the temperature thereof reaches about 150°. The heating element 24 must them be manually started again by means of a push-button. If the heating element 24 malfunctions, and does not turn off, a fuse may be provided which blows when the temperature reaches about 300°.

Various types of smolderable materials, such as wood chips, or dust, may be utilized in association with particular types of foods to be smoked. Examplary wood chips, or dust, are alder, oak, maple, hickory, apple, cherry, plum, peach, sassafras, tea tree and mesquite. Additionally, it has been found that a mixture of nut and fruit wood dust or chips provides a satisfactory taste and aroma for many types of foods. In particular, a mixture of 90% apple wood and 10% hickory wood is particularly suited for dark meats, such as steaks and the like, whereas a mixture of 10% apple wood and 90% hickory wood is preferred for lighter meats such as pork, fowl and seafood. Other foods may be enhanced with different types of wood chips or dust, such as alder, cherry, mesquite, etc. In any event, only a very small quantity of wood chips or dust, on the order of one quarter teaspoon or less, is necessary to smoke several pounds of meat or other comistible. In fact, it has been found that one ounce of wood chips, dust, wafers, etc. is sufficient to charge the smoker 1 forty or more times for a smoker 1 of a size which will hold up to six pounds of food at one time.

Figure 5:
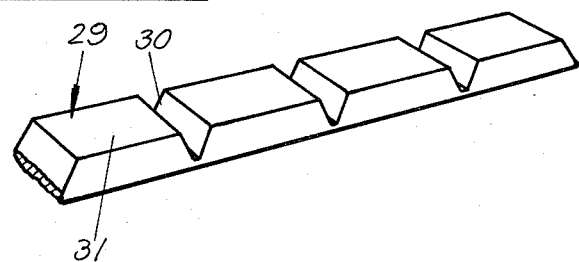
FIG. 5 is a perspective view of a frangible stick of combustible material for use with the smoker of the present invention.

As an alternative to using a smolderable material comprising chips or dust, a pill-like wafer such as wafer 28 shown positioned in pan 18 in FIG. 3, may be utilized. Such a wafer may be formed of compacted wood dust or wood dust held together with a binder, such as starch, bentonite, lignin, and the like. This particular form of smolderable material eliminates the need for measuring the amount of smolderable material necessary, and makes replacement of the smolderable material more certain. As an alternative, the pill-like wafer or pellet 28 may be used without heating element 24 by being ignited such that it smolders like punk or incense to produce the desired quantity of smoke for the desired period of time. Finally, the smolderable material may be provided in the form of a frangible stick, such as that shown generally at 29 in FIG. 5. Stick 29 comprises a smolderable material of composition similar to that described hereinbefore in connection with pellet or wafer 28, having a series of spaced notches 30 such that individual premeasured pieces of stick 29 may be broken off to form individual pellets 31 which may be utilized as described hereinabove. Pellets 31 may be of the same length, or may be of dissimilar lengths to produce different quantities of smoke, or to lengthen the smoking time, depending upon the quantity or type of food to be treated.

It will also be understood that the wood chips and/or wood dust may be enclosed, in a premeasured amount, in a smolderable packet, tube, etc., which may be either laid in the pan 18 to be pyrolized in the same way as loose, manually measured wood chips and/or wood dust, or may be packed in a smolderable packet, tube, etc. to be lighted manually with a match and allowed to smolder without artificial heating means in the same way and to accomplish the same result as the compacted or binded pill-like wafer or pellet 28. An example of such a packet is a cigarette using cigarette paper rolled around compacted wood dust. The packet may be lighted with a match and allowed to burn in the pan 18, giving off the wood smoke until it is burned out.

Smoker unit 12 may also be removed from the smoker enclosure 2, and utilized with existing cooking appliances, such as roaster ovens, toaster ovens, microwave ovens, conventional ovens, etc. In some situations, it may be desirable to place smoker unit 12 within the cooking appliance and activate the heating element to generate the desired quantity of smoke from a measured amount of smolderable material. In other cases, smoker unit 12 may be attached to the cooking appliance in a manner similar to that described hereinabove for attachment to smoker enclosure 2, such that it forms a part of the appliance. In either case, the smoker unit provides the cooking appliance with the ability to produce food having a smoked taste or aroma, which heretofore has been unavailable with conventional cooking appliances.

Similarly, it will of course, be understood that the pellet or wafer 28 or the stick 29 may be used in conventional cooking and dehydrating appliances to pre-smoke food stuffs prior to cooking or to smoke foodstuffs during the cooking process.

In operation, the comistible to be treated, such as that shown in FIG. 2 and FIG. 3 at 32, is placed within smoker enclosure 2 on one of racks 8. Door 4 is then closed. The proper amount of smolderable material is placed within depression 19 of pan 18, and smoker unit 12 attached to the rear wall of enclosure 2, or placed within the conventional cooking appliance, as described hereinabove. If an electrically energized embodiment is being utilized, electrical conductors 27 are plugged into a suitable source of electric power, and timer 25 activated to energize heating element 24 for the required period of time. If one of the other types of smolderable material described hereinabove is being used, the procedure for the material would be followed to produce the required quantity of smoke.

After food 22 has absorbed the smoke produced, as verified by viewing the food through window 6, door 4 may be opened and the food removed for cooking, if required, by any conventional means such as frying, roasting, grilling, broiling, marinating, etc., without effecting the smoke flavor or taste imparted to the food.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are defined as follows:

1. A smoker for quickly imparting a smoked flavor to comistibles and the like comprising:
   (a) a receptacle including means for introducing the comistible into the interior of the smoker and an opening in said receptacle for attaching a smoker unit thereto;
   (b) means within said receptacle for supporting the comistible;
   (c) a pan-like support positioned within said smoker for holding a small quantity of smoke producing material, said support means being positioned in non-overlying relationship with said pan-like support to prevent any part of the comistible, including fluids discharged therefrom, from contacting said pan-like support;
   (d) means adjacent said pan-like support for heating the smoke producing material to a temperature sufficient to produce a desired quantity of smoke, but resulting in a relatively small temperature rise within said receptacle; and
   (e) a smoker unit comprising an enclosure having an opening therein and means for removably attaching said smoker unit to the exterior of said receptacle with said smoker unit opening coextensive with said receptacle opening such that the interior of said enclosure communicates with the interior of said receptacle, said pan-like support and said heating means being located within said enclosure, and attaching means comprising a first outwardly directed flange-like lip extending partly around the periphery of said smoker unit opening and the secondly outwardly directed flange-like lip extending around the remaining periphery of said smoker unit opening, the surface of said first lip facing away in the opposite direction to said smoker unit opening and being adapted to abut the interior wall of said receptacle adjacent said receptacle opening, said second lip facing in the same direction as said smoker unit opening and being adapted to abut the exterior wall of said receptacle adjacent said receptacle opening, said enclosure being attachable to said receptacle by inserting said first lip within said receptacle opening such that a portion of said wall abutting surface of said first lip abuts said interior wall and pivoting said enclosure to move said second lip towards said receptacle opening, the weight of said smoker unit pivoting about said interior wall holding and substantially sealing said wall abutting surface of said second lip against said exterior wall adjacent said receptacle opening, said smoker being substantially airtight to prevent escape of smoke therefrom for rapidly imparting the smoked flavor to the comistible.

2. The smoker according to claim 1 wherein said comistible supporting means comprising one or more spaced racks, the ends of said racks adjacent some of the interior wall surfaces of said receptacle being shaped to prevent contact between the comistible and the interior surface of the receptacle.

3. The smoker according to claim 1 wherein a removable drip pan is provided in the bottom of said enclosure 2.

4. The smoker according to claim 1 wherein said comistible introducing means includes a transparent window for observing the comistible within the smoker.

5. The smoker according to claim 1 wherein said smoker includes timing means in association with said heating means for heating the smoke producing material for a realtively short predetermined period of time.

6. The smoker according to claim 5 wherein said heating means comprises an electric heating element.

7. The smoker according to claim 6 wherein said timing means operates to sense the temperature within said smoker to terminate heating of said heating element when a predetermined temperature is reached.

8. The smoker according to claim 1 wherein said pan-like support contains a substantially planar shelf-like support member containing a depression dimensioned to accept a predetermined quantity of smoke producing material.

9. The smoker according to claim 1 wherein said smoker unit is attached to said receptacle below the horizontal centerline of said receptacle.

10. The smoker according to claim 1 wherein said receptacle is made of wood.

11. The smoker according to claim 1 wherein said receptacle is made of plastic.

12. The smoker according to claim 1 wherein said receptacle is made of metal.

* * * * *